United States Patent [19]
Hahn et al.

[11] 3,944,154
[45] Mar. 16, 1976

[54] FILM CASSETTE

[75] Inventors: Werner Hahn; Heinz Schulze, both of Dresden; Bernhard Walther, Dessau, all of Germany

[73] Assignee: Veb Pentacon Dresden, Dresden, Germany

[22] Filed: Dec. 24, 1974

[21] Appl. No.: 536,234

[52] U.S. Cl. ............................................. 242/71.2
[51] Int. Cl.² ............................................. G03B 1/04
[58] Field of Search .................. 242/71.2, 199, 71.1

[56] References Cited
UNITED STATES PATENTS

| | | | |
|---|---|---|---|
| 3,140,832 | 7/1964 | Cech | 242/199 |
| 3,592,404 | 7/1971 | Nerwin | 242/71.2 |
| 3,837,599 | 9/1974 | Souza | 242/74 |
| R20,595 | 12/1937 | Bouveng | 242/199 |

*Primary Examiner*—Edward J. McCarthy
*Attorney, Agent, or Firm*—William A. Drucker

[57] ABSTRACT

The film cassette for photographic cassette cameras comprises supply and take-up chambers interconnected by a web having front and rear walls. The rear wall has a film presser surface and the front wall is provided with an exposure window defined by side walls. Fitting elevations are provided on the side walls of the exposure window extending parallel with the film transport direction. The fitting elevations commence in the plane of the film pressure surface and extend out beyond the plane which the front of the film occupies when in the pressed position against the presser surface. Guide surfaces are provided on said fitting elevations which face the longitudinal edges of the film, said surfaces lying in one common plane together with the longitudinal edges of the film. On insertion of the cassette into the camera the guide surfaces on the fitting elevations engage both the surfaces of the film and the sides of the film trap located in the camera.

4 Claims, 6 Drawing Figures

FILM CASSETTE

BACKGROUND TO THE INVENTION

The invention relates to a film cassette having a supply chamber and a take-up chamber and a web connecting the two chambers, the rear wall of which web is provided with a film presser surface and the front wall of which possesses an exposure window into which a film trap on the camera can be introduced.

In known cassettes of this kind, first fitting surfaces for the lateral orientation of the film strip in the cassette and second fitting surfaces for the orientation of the cassette in the camera are provided. Even in the case of close tolerances, cumulative tolerances produce danger of undesired film shifting in relation to the film trap of the camera, which has a disadvantageous effect especially in the case of miniature cameras.

An object of the invention is to provide a film cassette for the improved and simplified orientation of the film in relation to the film trap on the camera.

SUMMARY OF THE INVENTION

In accordance with the invention this is achieved in that fitting elevations are provided on the side walls of the exposure window extending parallel with the direction of conveying of the film, which elevations commence in the plane of the film presser surface and extend out beyond the plane which the front of the film occupies when in the pressed position against the film presser surface, and guide surfaces on said fitting elevations face the longitudinal edges of the film which surfaces lie in one common plane together with the longitudinal edges of the film whereby on insertion of the cassette into the camera, the guide surfaces on said elevations engage both the surfaces of the film and the sides of the film trap. The term "film" is intended to include film protective strip. According to preferred embodiments the fitting elevations can be arranged with spacing from the transverse walls defining the picture window in the direction of conveying of the film or directly beside the transverse walls defining the picture window in the direction of conveying of the film. Several guide surfaces are expediently allocated to each of the two longitudinal edges of the film. According to one particular feature of the film the fitting elevations have end distance surfaces which on insertion of the cassette into the camera hold the front surface of the film in the plane of the film trap of the camera when in the position pressed, possibly together with a film protective strip, entirely against the rear wall of the cassette.

BRIEF DESCRIPTION OF DRAWINGS

The invention will now be described with reference to the accompanying drawings in which.

DESCRIPTION OF PREFERRED EMBODIMENT

Figure 3:
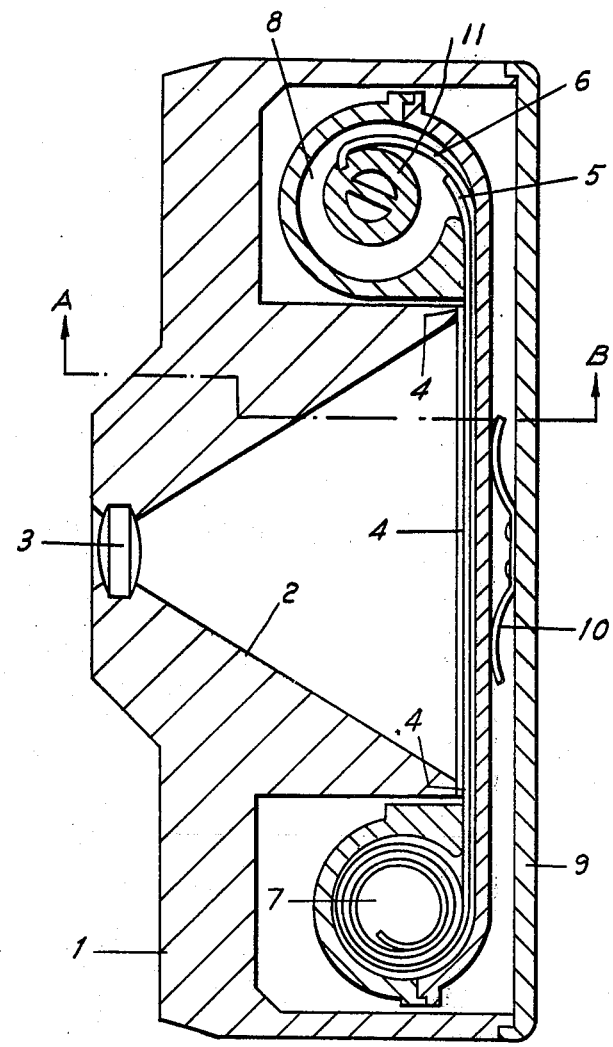
FIG. 3 shows a film cassette according to the invention inserted into a camera.

In the camera housing 1 (see FIG. 3) the picture-taking lens 3 is arranged on the front of the light chamber housing 2. The back of the light chamber 2 is formed by the film trap 4. The film trap 4 extends into the exposure window of the film cassette, in which the film strip 5 together with the protective strip 6 is conveyable from the supply chamber 7 into the take-up chamber 8. The presser spring 10, which presses the film cassette against the film trap 4 when the camera is closed, is secured to the back cover 9 of the camera.

The film cassette consists of a supply chamber 7 and the take-up chamber 8. The supply coil is situated in the supply chamber 7 of the film cassette, the commencement of the protective strip 6 being connected with the take-up spool 11 and the commencement of the film strip 5 being connected with the protective strip 6. The two chambers 7 and 8 (see FIG. 1) are connected by the web 12 of which the front of the rear wall is provided with a film presser surface 13. The picture window is formed in the front wall of the web by the side walls 14 and the transverse walls 15. Fitting elevations 16 having guide surfaces 17 facing the lateral edges of the film strip 5 are provided on the side walls 14 extending parallel with the direction of conveying of the film strip 5. The guide surfaces 17 are arranged in one common plane together with the lateral edges of the film strip 5 and of the protective strip 6. The guide surfaces 17 extend transversely of the direction of conveying of the film strip 5, commence at the film presser surface 13 and extend out beyond the plane which the front of the film strip 5 occupies when in position pressed together with the protective strip 6 entirely against the film presser surface 13. This plane is at the same time the plane of the film trap 4, on which the front of the film strip 5 rests.

Figure 4:
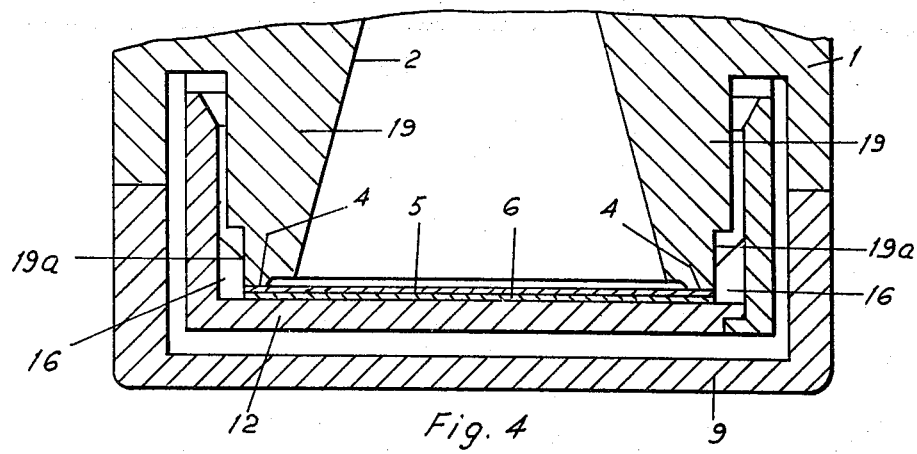
FIG. 4 shows a section through FIG. 3 along the line A–B.

The longitudinal walls 19 of the film trap 4 of the camera have external fitting surfaces 19a which, apart from necessary small tolerances, are arranged in the plane of the guide surfaces 17 (see FIG. 4), so that the fitting surfaces 19a of each longitudinal wall 19 of the film trap 4, the lateral edges of the film strip 5 and of the protective strip 6 and the guide surfaces 17 of the cassette lie in one common plane. On insertion of the film cassette into the camera therefore the film strip 5 is orientated directly in relation to the film trap 4 of the camera by the guide surfaces 17.

Figure 1:
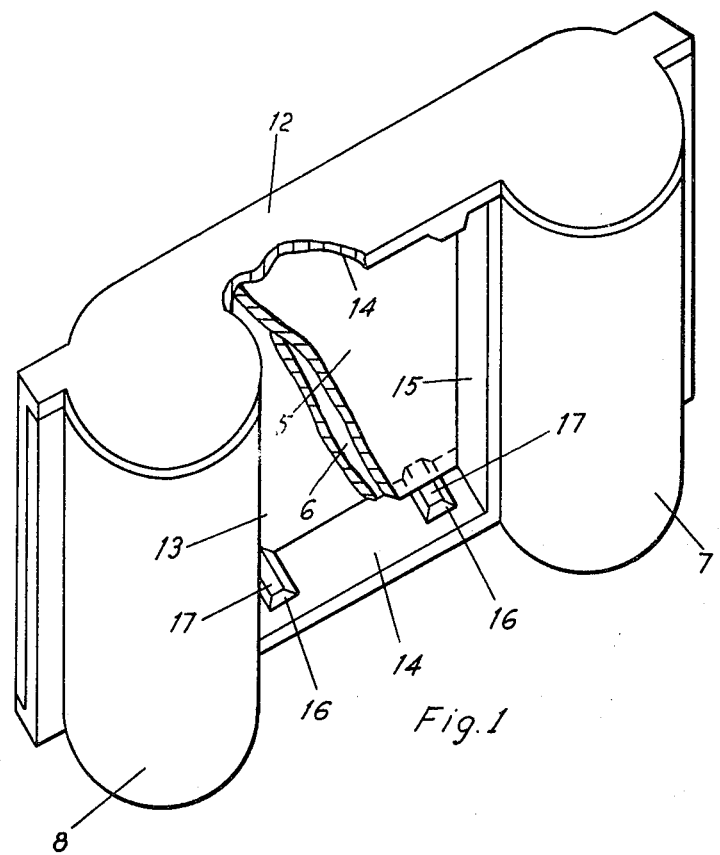
FIG. 1 shows a film cassette according to the invention.
Figure 2:
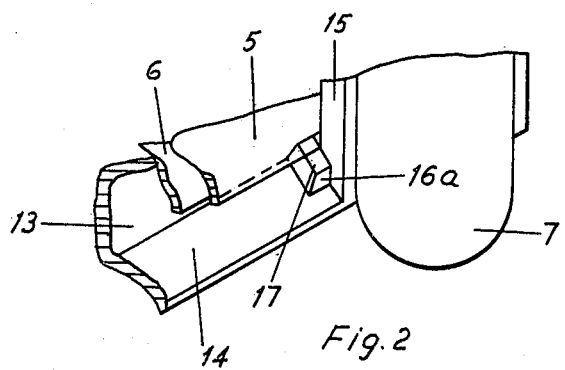
FIG. 2 shows a further arrangement of the fitting elevations.

In departure from the embodiment according to FIG. 1, in the embodiment according to FIG. 2 the fitting elevations 16 are arranged directly beside the transverse walls 15 of the picture window.

Figure 5:
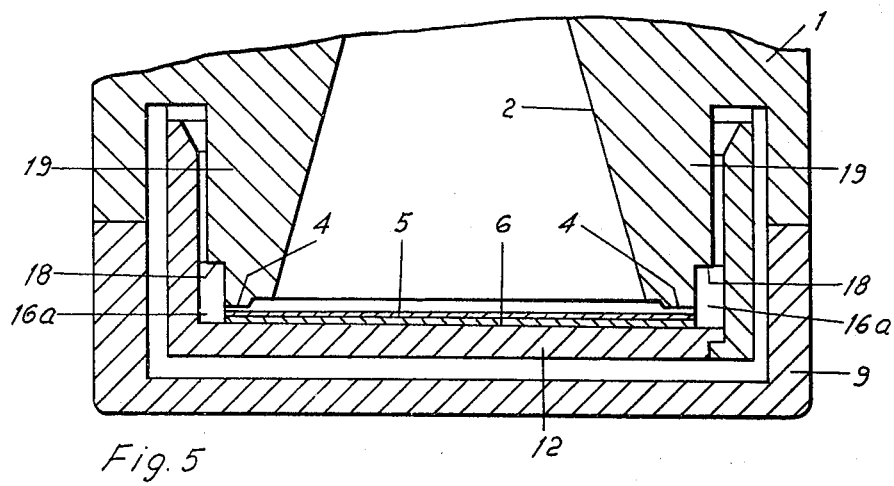
FIG. 5 shows a section according to FIG. 4 with a different conformation of the film cassette in accordance with the invention and FIG. 5a shows a detail of FIG. 5.
Figure 5A:
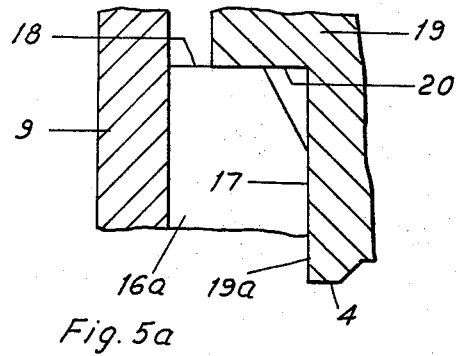

According to the example of embodiment as shown in FIG. 5, fitting elevations 16a are provided having end distance surfaces 18 (see FIG. 5a) which on insertion of the cassette into the camera meet with support surfaces 20 provided laterally of the film trap 4. These distance surfaces 18 and support surfaces 20 avoid jamming of the film strip 5 and of the protective strip 6 between the film trap 4 and the film presser surface 13, even if a relatively strong presser spring 10 is used.

We claim:

1. A film cassette for photographic cassette cameras having a film trap and a housing with a film presser thereon said cassette comprising:
   a. a supply chamber,
   b. a take-up chamber, c. a web connecting the two chambers, said web having a front and
d. a rear wall,
e. a film presser surface on said rear wall,
f. an exposure window defined by side and transverse walls extending from the front wall of said web into which window the film trap on the camera can be introduced,
g. fitting elevations provided on the side walls of the exposure window extending parallel with the direction of conveying of the film, which elevations commence in the plane of the film presser surface and extend out beyond the plane which the front of the film occupies when in the pressed position against the film presser surface and
h. guide surfaces on said fitting elevations facing the longitudinal edges of the film, which surfaces lie in one common plane together with the longitudinal edges of the film whereby on insertion of the cassette into the camera, the guide surfaces on said elevations engage both the surfaces of the film and the sides of the film trap.

2. A film cassette according to claim 1, wherein the fitting elevations are arranged with spacing from the transverse walls defining the picture window in the direction of conveying of the film.

3. A film cassette according to claim 1, wherein the fitting elevations are arranged directly beside the transverse walls defining the picture window in the direction of conveying of the film.

4. A film cassette according to claim 3, wherein several guide surfaces are allocated to each of the two longitudinal edges of the film.

* * * * *